May 1, 1923.

R. SHIELDS 1,453,770

COMBINED LICENSE PLATE, TAIL LIGHT, AND SIGNAL LIGHT BRACKET

Filed March 21, 1922

Inventor:
Roland Shields
By Chapin & Ferguson
Attorney

Patented May 1, 1923.

1,453,770

UNITED STATES PATENT OFFICE.

ROLAND SHIELDS, OF BALTIMORE, MARYLAND.

COMBINED LICENSE-PLATE, TAIL-LIGHT, AND SIGNAL-LIGHT BRACKET.

Application filed March 21, 1922. Serial No. 545,489.

*To all whom it may concern:*

Be it known that I, ROLAND SHIELDS, a citizen of the United States, residing at Baltimore, in the State of Maryland, have invented certain new and useful Improvements in Combined License-Plate, Tail-Light, and Signal-Light Brackets, of which the following is a specification.

This invention relates to improvements in combined license plate, tail light and signal light brackets, and has for its object to provide a simple, cheap and efficient device for holding the tail light, two signal lights and the license plate.

The invention consists of the novel construction and arrangement of the parts and combination of parts hereinafter more fully set forth in the following specification and pointed out in detail in the appended claims.

In the accompanying drawing,—

Figure 1:
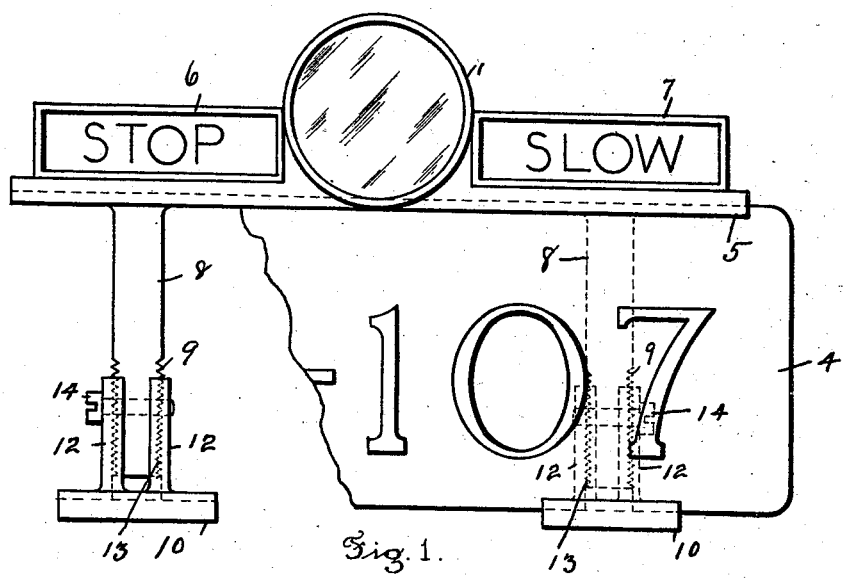
Figure 1 is a front elevation of my invention, showing the license plate partly broken away.
Figure 2:
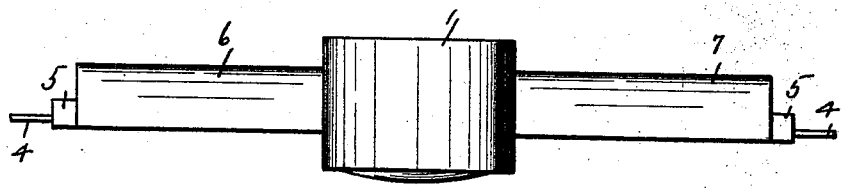
Figure 2 is a top plan view of Figure 1.
Figure 4:
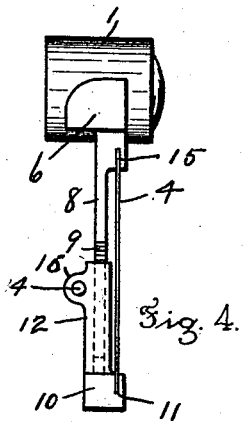
Figure 4 is an end view of Figure 1.
Figure 3:
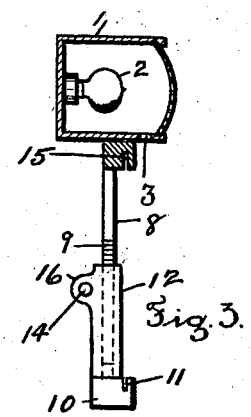
Figure 3 is a vertical section of Figure 1.

Referring to the accompanying drawing, forming part of this specification, and in which like reference numerals designate like parts throughout the several views, 1 designates the tail light case which is provided with the usual electric bulb 2 and an aperture 3 to allow the light to be thrown down on the front of the license plate 4. The said tail light case 1 is secured to the upper surface of the metal piece 5 of the license bracket. Also secured to the upper surface of the piece 5 of the license bracket, on opposite sides of the tail light case, are two cases 6 and 7, each provided with glass fronts, one of which has the word "Stop" and the other "Slow," and each being provided with electric bulbs (not shown) adapted to be operated to indicate the stopping or slowing down of the machine on which the device is employed. Projecting downwardly from the upper metal piece 5 of the license bracket are two arms 8 each provided with teeth 9 on their opposite edges at the lower ends thereof. Adjustably secured to the lower ends of each of the arms 8 is a rest 10 each provided with a groove 11 and upwardly-projecting clamping pieces 12 into which latter the lower ends of the arms 8 fit and each provided with teeth 13 adapted to co-operate with the teeth 9 on said arms 8. The said clamping pieces 12 are adapted to yield when forced up or down on the arms 8, and are held securely by the bolts 14 which pass through the lugs 16 on the back of the pieces 12. The license plate 4 slides in the groove 15 in the piece 5 and has its lower edge resting in the groove 11 of the rests 10. Said rests 10 being adjustable on the arms 8 to accommodate the various sizes of license plates.

Having thus described my invention, what I claim is:

1. The combination of a metal piece having a groove in its lower surface and two downwardly-projecting arms each provided with teeth on their opposite edges, a rest on each of said arms each having a groove therein and teeth on their inner surfaces adapted to co-operate with the teeth on the said arms, and means to hold the said rests in position on said arms.

2. The combination of a metal piece having a groove in its lower surface and two downwardly-projecting arms each provided with teeth on their opposite edges, a rest on each of said arms each having a groove therein and teeth on their inner surfaces adapted to co-operate with the teeth on the said arms, means to hold the said rests in position on said arms, a license plate held by said rests, and a tail light casing secured to the upper surface of the said metal piece and having an opening in the bottom thereof and above the license plate.

In testimony whereof I affix my signature.

ROLAND SHIELDS.